No. 618,817. Patented Jan. 31, 1899.
S. VANSTONE.
MANUFACTURE OF METALLIC TUBES OR NUTS.
(Application filed Apr. 1, 1897.)

(No Model.)

WITNESSES:

INVENTOR:

UNITED STATES PATENT OFFICE.

SAMUEL VANSTONE, OF PROVIDENCE, RHODE ISLAND.

MANUFACTURE OF METALLIC TUBES OR NUTS.

SPECIFICATION forming part of Letters Patent No. 618,817, dated January 31, 1899.

Application filed April 1, 1897. Serial No. 630,319. (No model.)

*To all whom it may concern:*

Be it known that I, SAMUEL VANSTONE, a citizen of the United States, residing at Providence, in the State of Rhode Island, have invented a new and useful Improvement in the Manufacture of Metallic Tubes or Nuts, of which the following is a specification.

The nature of my invention consists in forming tubes or nuts by first forming the grooved opposite halves of the tube or nut bar, then perforating the edges of the same in a direction inclined to the sides to be welded, and riveting the said opposite halves together by means of angularly bent or curved rivets, whereby the said halves will be firmly held to each other preparatory to heating in the furnace, then heating the same to a welding heat, and passing the same in the heated condition between suitable rolls to firmly weld the said halves together.

Figure 2:
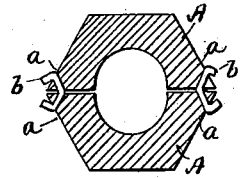
Figure 1:
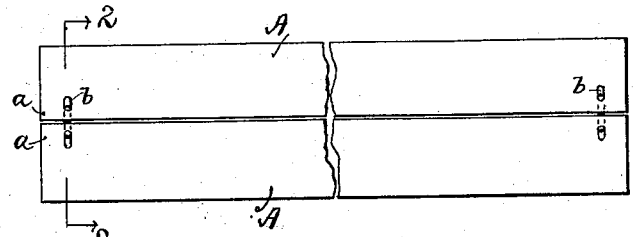

In the accompanying drawings, Figure 1 represents a side view of the connected halves of a tube adapted, when welded to each other by heating and rolling, to be sawed transversely into hexagonal nut-blanks. Fig. 2 represents a section taken in the line 2 2 of Fig. 1.

In the drawings, A A represent the longitudinal halves required to form a tube, having a cylindrical cavity and a hexagonal cross-section, the said halves being separately rolled in bars and drilled or punched in an inclined direction at the opposite edges $a\ a$ to receive the curved or bent connecting-rivets $b\ b$, by means of which the halves A A are first secured together for the purpose of being heated and then welded by passing between suitably-formed rolls, after which the bar is to be sawed transversely into nut-blanks of suitable thickness; and the gist of my invention consists in the employment of the curved or bent fastening-rivets in connection with the heating and welding of the said halves, and by means of the curved and angularly-bent rivets the halves will be firmly held together when they are being heated and turned about in the furnace.

The advantage secured by making the perforations for holding the connecting-wires in an inclined direction, as shown, arises from the fact that when the preforations are thus made the wires $b\ b$ will serve to form a connecting-joint without the necessity of heading over the ends of the wires, as would be required with perforations made in line with each other, so that in this case the proper connection of the parts to each other can be very readily and cheaply effected.

I claim as my invention—

The improvement in the manufacture of metallic tubes, or nuts, which consists in first forming the tube or nut blank in grooved longitudinal halves, then perforating the edges of the said halves in oppositely-inclined directions, and inserting curved or bent rivets in the said perforations, to secure the said halves together for heating, and then heating the same to a welding heat, and then passing the same between suitable rolls to firmly weld the halves to each other, as set forth.

SAMUEL VANSTONE.

Witnesses:
SOCRATES SCHOLFIELD,
THOMAS S. REED.